United States Patent [19]

Kawakami

[11] 4,277,836
[45] Jul. 7, 1981

[54] COMPOSITE RANDOM ACCESS MEMORY PROVIDING DIRECT AND AUXILIARY MEMORY ACCESS

[75] Inventor: Yuichi Kawakami, Tokyo, Japan

[73] Assignee: Nippon Electric Co., Ltd., Tokyo, Japan

[21] Appl. No.: 934,982

[22] Filed: Aug. 18, 1978

Related U.S. Application Data

[63] Continuation of Ser. No. 752,892, Dec. 21, 1976, abandoned.

[30] Foreign Application Priority Data

Dec. 25, 1975 [JP] Japan ................... 50-152906

[51] Int. Cl.³ ............ G06F 13/06; G11C 11/40; G11C 5/02
[52] U.S. Cl. .................. 364/900; 365/94; 364/716
[58] Field of Search ... 364/200 MS File, 900 MS File, 364/716; 365/222, 231, 230, 233, 94, 104, 105, 107, 189, 220, 221

[56] References Cited

U.S. PATENT DOCUMENTS

| 3,737,879 | 6/1973 | Greene et al. ................. 365/222 |
| 3,753,242 | 8/1973 | Townsend ..................... 364/200 |
| 3,790,961 | 2/1974 | Palfi et al. ................... 365/233 X |
| 3,846,765 | 11/1974 | DeVries ...................... 365/230 X |
| 3,903,510 | 9/1975 | Zobel ......................... 364/900 |
| 3,911,404 | 10/1975 | O'Neill, Jr. ................... 364/900 |
| 3,936,812 | 2/1976 | Cox et al. ..................... 365/94 |
| 3,940,747 | 2/1976 | Kuo et al. .................... 365/231 X |
| 4,041,459 | 8/1977 | Horninger .................... 364/716 |

Primary Examiner—Harvey E. Springborn

[57] ABSTRACT

An improved random access memory permits non-CPU involved, direct access for data read out to a portion of memory - as for information display purposes. The composite memory (and thereby also apparatus employing such a memory) may thus be more readily and inexpensively fabricated, not requiring either a dedicated, separate display register or stored instructions for memory-to-display register information transfer. The memory includes first and second portions each capable of central process or access, the second memory segment being subject to direct, non-CPU aided addressing when not engaged by the CPU.

5 Claims, 10 Drawing Figures

COMPOSITE RANDOM ACCESS MEMORY PROVIDING DIRECT AND AUXILIARY MEMORY ACCESS

DISCLOSURE OF INVENTION

This is a continuation of Ser. No. 752,892 filed Dec. 21, 1976, to be abandoned.

The present invention relates to a memory device for use in a data processing system, and more particularly to a random access unit in which stored information can be read-out independent of main address signals from a central processing unit (hereinafter referred to as CPU).

Where it is desired to display a part of the information stored in a prior art random access memory device, it has often been the practice, that the desired part of the stored information is transferred to a display register in response to a command signal from a CPU, and then displayed by display means. This necessitates special provision of a display register as well as a program for generating the transfer-command signal, and thus does not give rise to a low-cost, simply operating data processing system.

An object of the present invention is to provide a random access memory in which a memory circuit can be employed in part as a display register, and thus there is no need to separately provide a display register.

Another object of the present invention is to provide a random access memory device in which it is possible to read-out information stored in a part of memory circuit independent of main address signals from a CPU.

A random access memory device according to the present invention comprises a random access memory circuit (hereinafter referred to as a RAM) devided into two portions, first means for addressing every memory cells of the RAM, second addressing apparatus for addressing memory cells of only one portion of the RAM, and third strucutre for connecting one portion of the RAM to either the first or second addressing apparatus. Connection of the one portion of the RAM to the first addressing apparatus is switched to the second such apparatus when that portion is not addressed by the first apparatus.

More particularly, the memory device according to the present invention comprises a memory circuit, main addressing apparatus for designating an address of memory cells of the memory circuit, auxiliary address apparatus for designating an address of a part of the memory cells, and structure for inhibiting the auxiliary address apparatus from designating any address of said part of the memory cells should the main address apparatus designate any address of said part of the memory cells. Thus designation of the address of said part of the memory cells by the auxiliary address apparatus is possible unless it is designated by the main address apparatus.

According to the present invention, a memory device comprises the auxiliary address apparatus which can designate an address for reading out information in part of a memory circuit by utilizing auxiliary address signals, and hence, except for the period when an address of that part is designated by main address signals sent from a CPU, the information stored in that part can be read out by the auxiliary address apparatus. Accordingly, if said part of memory circuit is used as a display register, then it is possible to easily read out a part of memory contents without the necessity of a separate display register and resort to a special program to generate a transfer-command signal from the CPU.

The instant invention will now be described in more detail with reference to the drawings, in which.

Figure 3:
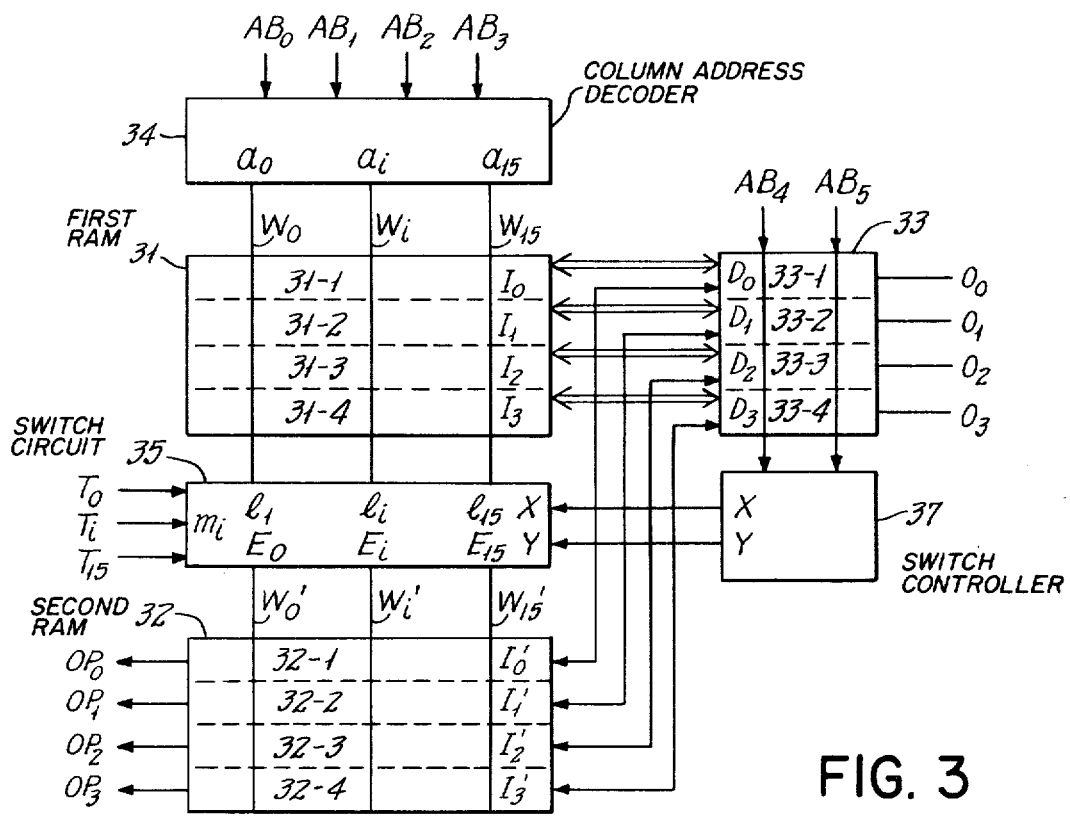
Figure 4:
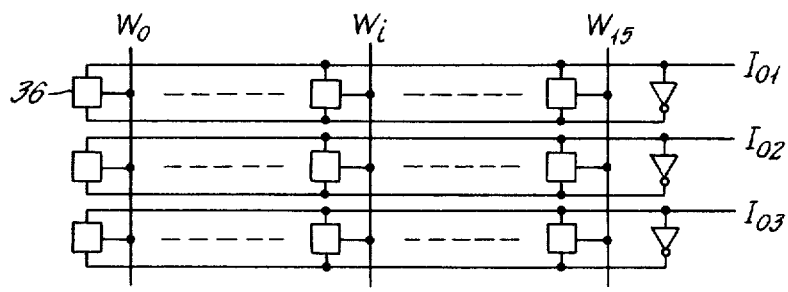
Figure 5:
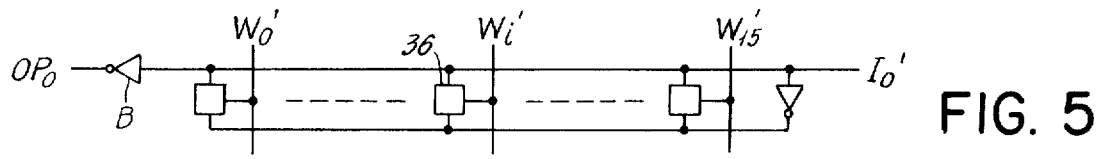
Figure 6:
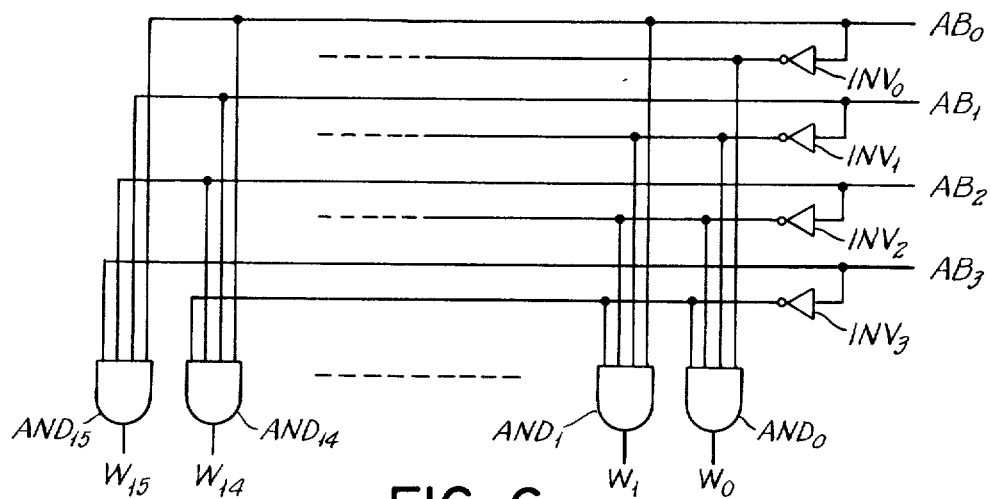
Figure 7:
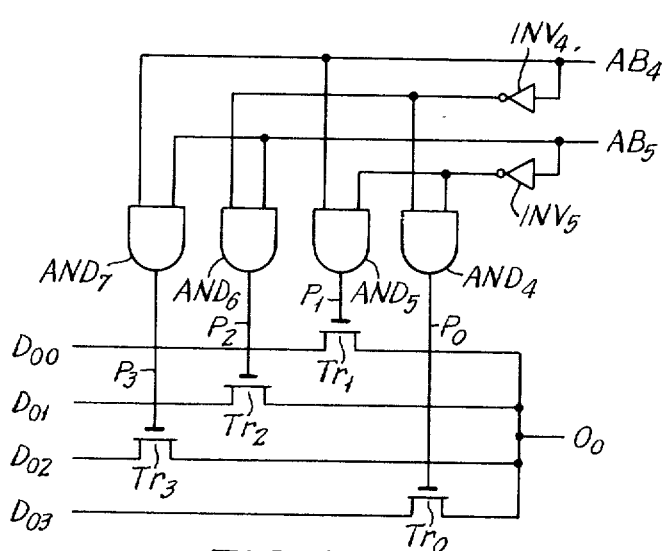
Figure 8:
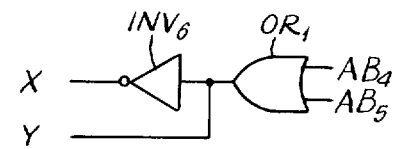
Figure 9:
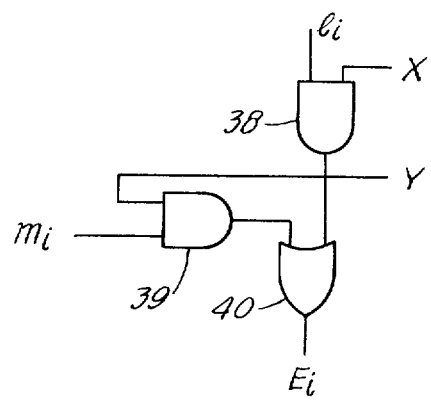
Figure 10:
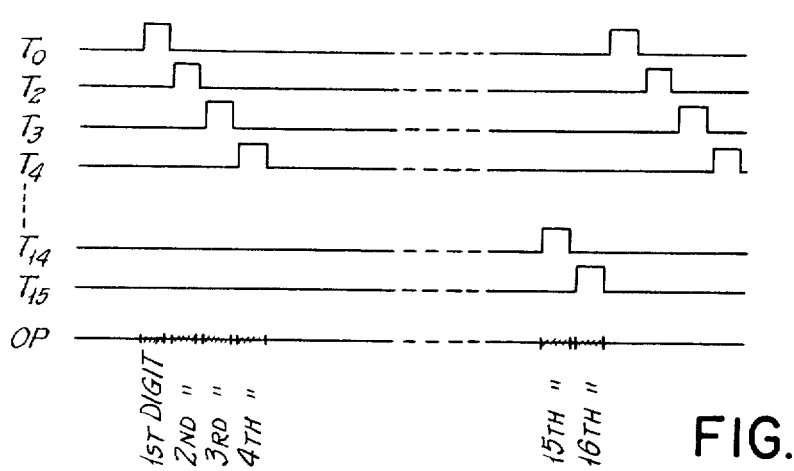

FIG. 3. is a block diagram showing one preferred embodiment of the present invention;

FIGS. 4 and 5 show FIG. 3 memory portions 31-1 and 32-1, respectively,

FIG. 6 is a schematic diagram showing one example of a decoder utilized in FIG. 3, FIG. 7 is a schematic diagram showing one example of a row line selector included in FIG. 3, FIG. 8 is a schematic diagram showing one example of a decision circuit utilized in FIG. 3, FIG. 9 is a schematic diagram showing one example of a signal switching circuit included in FIG. 3; and FIG. 10 is a time chart showing auxiliary address signal waveforms and read-out timing of memory information.

Figure 1:
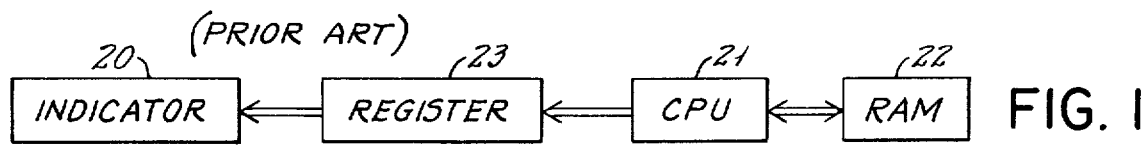
FIG. 1 is a block diagram for explaining a process for displaying information stored in a memory in conventional electronic computers.

Referring now to FIG. 1, there is shown in block form a process for displaying information stored in a memory 22 on an indicator 20 in conventional electronic computers, in which either input information or a computational result obtained by operations in a CPU 21 is stored in the memory, that is, RAM 22. When stored information is required for display, it is transferred to a display register 23 via the CPU 21, and is displayed on an indicator 20. Accordingly, the prior art apparatus suffers the disadvantages that a display register 23 must be specially provided, and that the program compliment array is increased since a command for transferring information from the RAM 22 where the information is stored to the display register 23 is necessary.

Figure 2:
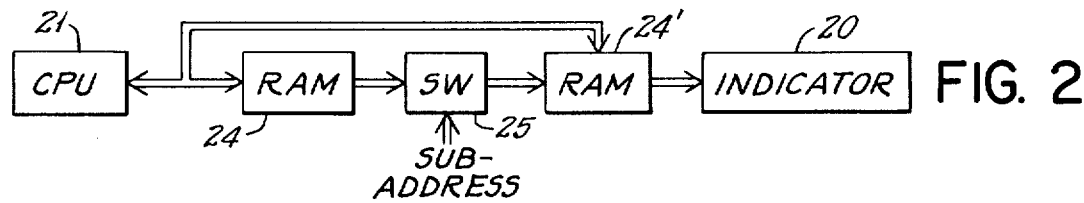
FIG. 2 is a block diagram for presenting the principles of the present invention.

FIG. 2 shows in block form a RAM circuit according to the present invention, and apparatus directly associated with the RAM. In this circuit of FIG. 2, memory cells of the RAM are divided into two groups 24 and 24'. A switching circuit 25 is provided, by which each address line of RAM 24' is switched to be connected to each address line (to thus provide direct non-CPU aided addressing) of the RAM 24 or each sub-address line in response to the main address signals from the CPU 21. The outputs of the RAM 24' are directly connected to an indicator 20. Assuming that each address line of the RAM 24' is connected by the switching circuit 25 to each sub-address line when the main address signals from the CPU 21 do not address any memory cell in the RAM 24', information stored in the RAM 24' is addressed to be read out by the sub-addressed signals, causing it to be displayed on the indicator 20 directly. Therefore, if the digit (i.e., bit or word elements) signals used for the operation of the computer are employed as the sub-address signals, the information stored in the RAM 24' is displayed without main address signals from the CPU. Accordingly, it is not necessary to provide a display register and the complex programs for commanding read out of stored information to the display register.

FIG. 3 shows in block form a construction of one preferred embodiment of the RAM circuit according to the present invention. Firstly explaining first the outline of the circuit construction, reference numeral 31 designates a first RAM of 16×1×14 bits in which read and write operations are performed only in response to the main address signals $AB_0$–$AB_5$ sent from the CPU. Reference numeral 32 designates a second RAM of 16×1×4 bits in which read and write operations are performed in response to the main address signals sent from the CPU and also in which read-out of the stored information is performed in response to auxiliary address signals $T_0$–$T_{15}$ sent from an auxiliary address generater not shown. Numeral 33 designates a circuit for controlling input and output lines of the two RAMs 31 and 32 in response to the signals $AB_4$ and $AB_5$ among the main address signals, that is, a row line selector circuit for the RAMs 31 and 32. Reference numeral 37 designates a decision circuit having output terminals X and Y for deciding combinations of the signals $AB_4$ and $AB_5$ and for controlling a signal switching circuit as described later in response to the combinations of the signals $AB_4$ and $AB_5$, and numeral 34 designates a column address decoder for selecting column address lines $W_i$, $W_i'$ of the RAMs 31, 32 responsive to the main address signals $AB_0$–$AB_3$.

Reference numeral 35 designates the signal switching circuit, which has been already referred to twice above without detailed explanation, which responds to the designation signals from the output terminals X and Y of the above-described decision circuit 37 for connecting the column address lines $W_0'$–$W_{15}'$ of the second RAM 32 to the corresponding column address lines $W_0$–$W_{15}$ of the first RAM 31 when the signals $AB_4$ and $AB_5$ among the main address signals designate any address in the second RAM 32, and for connecting the column address lines $W_0'$–$W_{15}'$ of the second RAM 32 to the corresponding ones of the auxiliary address signal lines $T_0$–$T_{15}$ when the signals $AB_4$ and $AB_5$ do not designate any address in the RAM 32. Accordingly, all information stored in the second RAM 32 can be directly read out by the auxiliary address signals so long as it is not designated by the main address signals and, furthermore, the operating function of the entire RAM device is not disturbed at all by such read-out operations by employing the sub-address signals. The whole arrangement in FIG. 3 forms a RAM device of 16×4×4 bits, and the second RAM 32 corresponds to the part of the memory cells which was previously used in this specification.

A more detailed description will be made on the constructions and functions of the respective blocks in FIG. 3 with reference to more detailed illustrations.

FIG. 4 is a detailed representation of one part 31-1 among the four parts in the first RAM 31 (FIG. 3), in which an array of memory cells 36 consisting of 3 rows and 16 columns is shown. The row groups of 16 memory cells are respectively connected to common input/output lines $I_{01}$, $I_{02}$ and $I_{03}$, and the column groups of 3 memory cells are respectively connected to column lines $W_0$–$W_{15}$ for selecting the memory cells. The column address lines $W_i$ (i=0~15, the same is true in the followings) are respectively connected to the output lines $a_i$ of the address 34. The remaining three parts 31-2, 31-3 and 31-4 have the same construction as the structure 31-1.

FIG. 5 is a detailed representation of one part 32-1 among the four parts in the second RAM 32, in which an array of 16 memory cells 36 aligned in one row is shown and input/output lines of the respective cells are connected to a common input/output line $I_0'$. To the respective memory cells are respectively connected column address lines $w_i'$ for selecting a memory cell. The input/output line $I_0'$ is connected to an output $OP_0$ through a buffer B e.g., an inverting amplifier. The column lines $W_i'$ are respectively connected to the output lines $E_i$ of the switching circuit 35. The remaining three parts 32-2–32-4 have the same construction as the part 32-1.

In FIGS. 4 and 5, for the memory cells 36, known memory cell circuits of the flip-flop type, for example, can be employed. Of course, other known transistor memory cells could be employed.

FIG. 6 shows one example of the column address decoder circuit 34, in which the main address signals $AB_0$–$AB_3$ sent from the CPU are binary digital signals each representing a logical "0" or "1". In response to a combination of true and complementary values of the 4-bit column address signals $AB_0$–$AB_3$, one of the 16 signal lines $W_0$–$W_{15}$ and $W_0'$–$W_{15}'$ forming the column address lines of the RAM's 31 and 32 is selected and activated. The respective address signals $AB_0$–$AB_3$ are applied to inputs of inverters $INV_0$–$INV_3$, respectively, to obtain their complementary signals $\overline{AB_0}$–$\overline{AB_3}$. The outputs of the respective inverters $INV_0$–$INV_3$ are applied to inputs of a 4-input AND circuit $AND_0$, that is, the complementary signals $AB_0$, $AB_1$, $AB_2$ and $AB_3$ for the address signals, so that its output $W_0$ is activated when the address signals ($\overline{AB_0}$, $\overline{AB_1}$, $\overline{AB_2}$, $\overline{AB_3}$) are (0,0,0,0). To the inputs of a 4-input AND circuit AND are applied the signals $AB_0$, $\overline{AB_1}$, $\overline{AB_2}$ and $\overline{AB_3}$, so that its output $W_1$ is activated when the address signals ($AB_0$, $AB_1$, $AB_2$, $AB_3$) are (1, 0, 0, 0).

In this way, the circuit arrangement is constructed so that only one of the outputs $W_i$ of the respective AND circuits $AND_i$ can be activated in response to a combination of true and complementary values of the address signals, resulting in designation of memory cells connected to the activated column line $W_i$.

FIG. 7 shows one illustrative implementation the row line selector 33 with respect to one part 33-1 among the four parts 33-1–33-4, and this part selects one of four input/output lines $D_{00}$–$D_{03}$ respectively connected to input/output lines $I_{01}$–$I_{03}$ and $I_0'$ of the RAM's 31 and 32 in response to the codes of the signals $\overline{AB_4}$ and $\overline{AB_5}$ among the main address signals $AB_0$ to $AB_5$, and connects the selected line to an input/output line $O_0$. This operation is identical for either writing information into the RAM's or reading information out of the same.

The main address signals $AB_4$ and $AB_5$ sent from the CPU are binary digital signals each representing a logical "0" or "1". In response to a combination of true and complementary values of the 2-bit row address signals $AB_4$ and $AB_5$ one of the input/output lines $D_{00}$~$D_{03}$ is selected. Accordingly, the address signals $AB_4$ and $AB_5$ are respectively applied to inputs of inverters $INV_4$ and $INV_5$ to obtain the respective complementary signals $\overline{AB_4}$ and $\overline{AB_5}$. "The complementary signals $\overline{AB_4}$ and $\overline{AB_5}$ are applied to inputs of a 2-inputAND circuit $AND_4$. Therefore, only when both the address signals $AB_4$ and $AB_5$ are "0," does the output $P_0$ of gate $AND_4$ becomes a "1" such that a transistor $Tr_0$, supplied with the output $P_0$ at its gate, become conducting, and hence the signal on the line $D_{03}$ applied to its source is transmitted to the output conductor $O_0$. To inputs of a 2-input AND circuit $AND_5$ are applied the signals $AB_4$ and $\overline{AB_5}$. Only when the address signals $AB_4$ and $AB_5$ are "1" and "0", respectively, the output $P_1$ of gate $AND_5$ becomes a "1", turning on a transistor $Tr_1$, hence coupling the signal on the line $D_{00}$ to the output line $O_0$.

To inputs of a 2-input AND circuit $AND_6$ are applied the signals $\overline{AB_4}$ and $AB_5$, so that only when the address signals $AB_4$ and $AB_5$ are "0" and "1", respectively, its output $P_2$ becomes a "1", and a transistor $Tr_2$ which is supplied with the output $P_2$ at its gate becomes conducting, and hence the signal on the line $D_{01}$ applied to its source is transmitted to the output $O_0$. Finally, are applied to inputs of a 2-input AND Circuit $AND_7$. the signals $AB_4$ and $AB_5$. Only when both the addresses signals $AB_4$ and $AB_5$ are "1", does output $P_3$ of gate $AND_7$ become a "1" turning on a transistor $Tr_3$ operatively connecting hence the signal on the line $D_{02}$ to the output $O_0$.

Accordingly, in response to a combination of true and complementary values of the address signals $AB_4$ and $AB_5$, one of the row lines $I_{01}$-$I_{03}$ or $I_0'$ is connected to the input/output line $O_0$ and, as a result, memory cells connected to said one row line are addressed and conditioned for reading and writing. The signal lines $D_{00}$, $D_{01}$ and $D_{02}$ are respectively connected to ths input/output lines $I_{01}$, $I_{02}$ and $I_{03}$ in FIG. 4, while the signal line $D_{03}$ is connected to the input/output line $I_0'$ in FIG. 5. The remaining three parts 33-2, 33-3 and 33-4 have the same construction as the part 33-1.

FIG. 8 shows one example of the decision circuit 37 in FIG. 3, which is a circuit for deciding a combination of the main address signals $AB_4$ and $AB_5$, and which has a construction such that if the address signals $AB_4$ and $AB_5$ designate memory cells within the second RAM 32 output signals $x=1$ and $y=0$ will appear at its output X and Y, but in other cases output signals $x=0$ and $y=1$ appear at its outputs. More particularly, the address signals $AB_4$ and $AB_5$ are applied to inputs of a 2-input OR circuit $OR_1$, whose output is delivered directly as the output Y, and further delivered via an inverter $INV_6$ as the output X.

When binary "0"s are applied to the inputs of the OR circuit $OR_1$ as address signals $AB_4$ and $AB_5$, that is, when the signal line $D_{03}$ in FIG. 7 is selected and the memory cell within the second RAM 32 is designated, a "0" is present at the output Y of the 2-input OR circuit $OR_1$, whereas at the output X of the inverter $INV_6$ a signal is developed "1", when either or both of the address signals $AB_4$ or $AB_5$ is a logic "1". That is, when a signal line other than the signal line $D_{03}$ is selected and thus the second RAM 32 is not designated, since at least one of the inputs of the 2-input OR circuit $OR_1$ is not "1", a "1" signal is delivered at the output Y, whereas a "0" signal is delivered at the output X.

FIG. 9 shows a construction of an illustrative i-th signal switching unit in the signal switching circuit 35 which comprises 16 logical circuits each forming a switching unit, in which reference characters $1_i$, $m_i$, X and Y represent inputs to this switching unit and reference character $E_i$ represents an output from the switching unit. The input $m_i$ is furnished with an auxiliary address signal $T_i$, the inputs X and Y are connected to the outputs X and Y, respectively, of the decision circuit 37, and the output $E_i$ is connected to a column line $W_i'$ of the second RAM 32.

When a memory cell in the second RAM 32 is designated by both the signals $AB_4$ and $AB_5$ among the main address signals being "0", that is , in the case that it is designated that among the terminals Djk (j=0~3, k=0~3; the same being true in the following) $D_{03}$, $D_{13}$, $D_{23}$ and $D_{33}$ should be connected to $O_0$-$O_3$, respectively, outputs $x=1$ and $y=0$ appear at the X terminal and Y terminal of the decision circuit 37. In FIG. 9, the signal x at the input terminal X and the signal $1_1$ are applied to inputs of an AND gate circuit 38 whose output functions as one input of an OR gate 40. The signal y at the input terminal Y and the signal $m_i$ are applied to inputs of an AND gate 39 whose output functions as the other input of the OR circuit 40, and the output of the OR circuit 40 is connected to the terminal $E_i$. In response to application of the input signals $x=1$ and $y=0$ to the input terminals X and Y, the output $a_i$ of the decoder circuit 34 is electrically connected to the output $E_i$ through the AND gate circuit 38 which is in an open state. Accordingly, the line $W_i'$ connected to the output $E_i$ is electrically connected to the output $a_i$.

Therefore, when the output terminal $a_i$ is selected by the main address signals $AB_0$~$AB_3$ and is activated, the column lines $W_i$ and $W_i'$ are activated.

In other words, the memory cells in the both RAM's 31 and 32 connected to the column lines $W_i$ and $W_i'$ are in a status where writing and reading are possible.

By way of example, assuming the case where reading of stored information is to be performed, in response to activation of the output terminal $a_i$, both the column lines $W_i$ and $W_i'$ become activated, the respective memory cells in the both RAMs 31 and 32 connected to the column lines $W_i$ and $W_i'$ assume a read-out status, and the respective stored information contents are delivered at the output terminals Ijk and I'j. Since the main address signals $AB_4$ and $AB_5$ designate an address in the second RAM 32, row lines $I_0'$, $I_1'$, $I_2'$ and $I_3'$ of the $RAM_{32}$ are selected among row lines $I_{jk}$ and $I'_j$, and output signals are delivered at the output terminals $O_0$-$O_3$ via the terminals $D_{03}$, $D_{13}$, $D_{23}$ and $D_{33}$. Accordingly, where an address in the second RAM 32 is designated, the first and second RAMs 31 and 32 jointly achieve the same function as a conventional RAM of 16×4×4 bits.

Consider now the case where a memory cell in the second RAM 32 is not designated by the main address signals. Signals $x=0$ and $y=1$ are under these circumstances delivered at the output terminals X and Y of the decision circuit 37. Accordingly, $x=0$ and $y=1$ signals are applied to the input terminals X and Y of the signal switching circuit 35 are applied signals $x=0$ and $y=1$, respectively. In response thereto, an auxiliary address signal $T_i$ applied to the input $m_i$ is delivered at the output terminal $E_i$. When the signal $T_i$ is "1", the output $E_i$ becomes activated, so that the column line $w'_i$ connected to the output $E_i$ becomes activated, resulting in a read-out status of the memory cells in the second RAM 32 to which the column line $W_i'$ is connected, and thereby read-out signals would appear on the lines $I_0'$, $I_1'$, $I_2'$ and $I_3'$. Although these output lines are connected to the row line selector 33, they cannot be selected because the signals $AB_4$ and $AB_5$ do not designate an address in the second RAM 32. Instead, the output signals are delivered at the outputs $OP_0$-$OP_3$ via the buffers B in FIG. 5. In other words, the information in any memory cell in the second RAM can be read out by means of the auxiliary address signals $T_0$-$T_{15}$.

Digit signals employed for circuit operations in an electronic computer are available to perform as the auxiliary address signals $T_0$-$T_{15}$. FIG. 10 is a time chart showing waveforms of the digit signals and the timing for reading out information stored in the RAM 32 designated by the auxiliary address signals. Where the information to be displayed is stored in the RAM 32 and the part of the memory cells in the RAM 32 is not designated by the main address signals, at first a digit signal $T_o$ for the first digit is applied to an auxiliary address input terminal $m_o$ of the signal switching circuit 35. Accordingly the output $E_o$ of the switching circuit 35 becomes activated, and thereby four memory cells 36 connected to the column line $W_o'$ of the RAM 32 are selectively designated. Consequently, information stored in these four memory cells is simultaneously delivered at the outputs $OP_0$–$OP_3$ via the inverters B. In other words, since the 4-bit information pattern for the first digit is delivered from the RAM 32 at its output terminals $OP_0$–$OP_3$ in synchronism with the digit signal $T_o$ for the first digit, this 4-bit output can be displayed on an indicator via a decoder (not shown). Likewise, 4-bit outputs corresponding to the remaining respective digits are read out of the RAM 32 and displayed in synchronism with the digit signals $T_2$–$T_{15}$ for the second and subsequent digits. From the above description it will be seen that if a first digit of data is stored in the memory cells connected to the column line Wo', and a second data digit is stored in the memory cells connected to the column line W1', and likewise the remaining digits up to the 16-th one are stored, then outputs synchronized with the digit signals $T_0$–$T_{15}$ which are independent of the main address can be delivered at the output terminals $OP_0$–$OP_3$.

Should the second RAM 32 be designated by the main address signals, information stored in the designated memory cells of course, is delivered at the output terminals $OP_0$–$OP_3$. However, if the designation period by the main address signals is selected for shorter than that by the auxiliary address signals, then at the output terminals $OP_0$–$OP_3$ would appear output information only for a short period of time, so that even if it should be displayed on the indicator it could be disregarded. It is a matter of course that a circuit may be separately provided for inhibiting display of information at the output terminals $OP_0$–$OP_3$ when the second RAM 32 has been designated by the main address signal.

Details of the operation of the memory circuit according to the present invention will be described in connection with the case where the second RAM 32 illustrated in FIG. 3 is employed as a display register, assuming that the following calculation should be performed:

$$123 + 567 = 690.$$

(1) When the number "123" is entered through an input device such as a keyboard or the like, each digit of the number is encoded into a 4-bit binary number. Then the CPU designates the RAM 32 by means of the main address signals $AB_0$–$AB_5$, and the information representing the number "123" is stored in this part of the memory circuit. When the address designation operations of the CPU by means of the main address signals $AB_0$–$AB_5$ have been completed, the digits "3", "2" and "1" are successively read out as 4-bit signals at the output terminals $OP_0$–$OP_3$ in response to the digit signals $T_0$, $T_1$ and $T_2$, respectively, illustrated in FIG. 10. These 4-signals are decoded into a decimal number and then displayed on the indicator.

(2) Next, when the number "567" is entered after a "+" key command is entered by means of the keyboard, the number "123" stored in the RAM 32 is transferred to a predetermined section of the RAM 31 in response to a command from the CPU, and the number "567" is stored in the RAM 32. After completion of these operations, the number "567" is read out and displayed in synchronism with the digit signals $T_0$–$T_2$ in the same manner as described in paragraph (1) above.

(3) When the "=" is depressed on the keyboard, the CPU designates the address of the RAM 31 where the number "123" is stored and the address of the RAM 32 where the number "567" is stored by means of the main address signals, and carries out the addition of these numbers. The CPU then designates the RAM 32 for storing the result of addition, that is, the number "690". After completion of these operations, the number "690" is read out and displayed in synchronism with the digit signals $T_0$–$T_2$.

Since the memory circuit according to the present invention is constructed as described above, when an address in the second RAM 32 is not designated by the main address signals, any information in a memory cell in the second RAM 32 can be read out by means of the auxiliary address signals, and further, the function as a normal RAM apparatus is not disturbed.

In the above-described circuit arrangement, the number of parts in the respective RAMs, the number of rows in one part, the number of cells in one row, and other numbers should not be limited to the values employed in the above-described embodiment. Also, the construction of each cell 36 and the construction of the signal switching circuit should not be limited to those illustrated in the drawings and described above, but various types of constructions could be employed.

What is claimed is:

1. A memory device comprising a first group of memory cells, a second group of memory cells, main addressing means for addressing both of said first and second groups of memory cells, subsidiary addressing means for addressing only said second group of memory cells, first output means operatively coupled with memory cells selected from those belonging to said first group and said second group by said main addressing means, second output means adapted to receive information from memory cells selected from those belonging only to said second group by said subsidiary addressing means, and control means responsive to said main addressing means for permitting said subsidiary addressing means to address said second group of memory cells.

2. The memory device of claim 1, in which said control means includes means for detecting when said main addressing means is addressing the memory cells belonging to said second group, and means coupled to said detecting means for operatively coupling said subsidiary addressing means to said second group of memory cells.

3. A memory device comprising a plurality of column lines, said column lines being divided into first and second column line parts, a plurality of first row lines intersecting said first column line part, a plurality of second row lines intersecting said second column line part, memory cells arranged at the intersections of said first and second column line parts and the row lines, a plurality of first data lines, a plurality of second data lines, means for selectively coupling selected row lines of said first and second row lines to said first data lines, means for coupling said second row lines to said second data lines, first selecting means for selecting said first column line parts, second selecting means for selecting said second column line parts, detecting means for detecting when said second row lines are coupled to said first data lines, and first gating means responsive to said detection means for inhibiting said second selecting means from selecting said second column line part when said second row lines are coupled to said first data lines.

4. The memory device of claim 3, in which the number of said second row lines is equal to that of said second data lines and less than that of said first row lines.

5. The memory device of claim 3, in which the number of said first row lines is n times larger than that of said second row lines, where n is an integer of two or greater.

* * * * *

UNITED STATES PATENT AND TRADEMARK OFFICE
CERTIFICATE OF CORRECTION

PATENT NO. : 4,277,836
DATED : July 7, 1981
INVENTOR(S) : Yuichi Kawakami

It is certified that error appears in the above-identified patent and that said Letters Patent are hereby corrected as shown below:

IN THE ABSTRACT:

Line 10 - "process or access," should be

--processor access,--

Signed and Sealed this

Twenty-ninth Day of September 1981

[SEAL]

Attest:

GERALD J. MOSSINGHOFF

Attesting Officer

Commissioner of Patents and Trademarks